(12) United States Patent
Rodriguez Aceves (10) Patent No.: US 9,131,802 B2
(45) Date of Patent: Sep. 15, 2015

(54) ROTATING GRILL FOR GRILLING FOOD

(76) Inventor: Patricia Isabel Rodriguez Aceves, Guadalajara (MX)

( * ) Notice: Subject to any disclaimer, the term of this patent is extended or adjusted under 35 U.S.C. 154(b) by 0 days.

(21) Appl. No.: 13/515,041

(22) PCT Filed: Oct. 12, 2010

(86) PCT No.: PCT/MX2010/000109
§ 371 (c)(1),
(2), (4) Date: Jun. 11, 2012

(87) PCT Pub. No.: WO2012/050412
PCT Pub. Date: Apr. 19, 2012

(65) Prior Publication Data
US 2013/0192474 A1   Aug. 1, 2013

(51) Int. Cl.
*A47J 37/04*     (2006.01)
*A47J 37/07*     (2006.01)

(52) U.S. Cl.
CPC ............ *A47J 37/043* (2013.01); *A47J 37/0786* (2013.01); *A47J 2037/0795* (2013.01)

(58) Field of Classification Search
CPC ..... A47J 37/04; A47J 37/043; A47J 37/0786; A47J 2037/0795; A47J 37/041; A47J 37/0704; A47J 37/0745; A47J 36/00; A47J 37/0731; H04Q 9/00; H04Q 2209/43; H04Q 2209/823; G01K 1/02; G08C 19/12
USPC ............. 99/443 R, 421 V, 419, 421 M, 421 P, 99/421 R, 421 H, 421 HV, 339, 342, 343, 99/344, 446, 492, 352, 355, 395, 444; 126/25 C, 8, 25 AA, 65, 1 R, 25 R, 29, 126/30, 9 A; 374/155, 141, 149, 179, 208; 340/870.17, 870.04, 870.09, 870.01, 340/379.6
See application file for complete search history.

(56) References Cited

U.S. PATENT DOCUMENTS 2,179,646 A * 11/1939 Spartalis ...................... 99/421 P
2,225,861 A * 12/1940 Dufour .................... 99/421 HV
2,482,601 A *  9/1949 Spartalis ..................... 99/421 R
2,819,667 A *  1/1958 Victor ............................. 99/339
(Continued)

OTHER PUBLICATIONS

International Search Report dated Jul. 7, 2011 for PCT application PCT/MX2010/000109.
(Continued)

*Primary Examiner* — Tu Hoang
*Assistant Examiner* — Eric Stapleton
(74) *Attorney, Agent, or Firm* — Garcia-Zamor IP Law; Ruy M. Garcia-Zamor (57) ABSTRACT

This invention refers to a spinning food grill characterized because it is mainly constituted by a base upon which an electric engine is mounted, which moves a main shaft which is held in a vertical position by a post that is placed parallel to it. This main shaft is held by oarlocks located over crossbars that are perpendicular to a post. The oarlocks allow the main shaft to spin freely; additionally it is provided with a height regulator which allows the modification of the height of a circular grill located in the upper extreme of such main shaft. In such way, the distance of the circular grill is controlled, allowing it to come near or move away from the heat source, in this case ignited charcoal, to roast foods. Also, this grill is accompanied by a pair of frames that allow its use in open spaces such as gardens or patios.

9 Claims, 9 Drawing Sheets

(56) References Cited

U.S. PATENT DOCUMENTS

| | | | | |
|---|---|---|---|---|
| 2,887,944 A * | 5/1959 | Walker | | 99/421 HH |
| 3,033,189 A * | 5/1962 | Clark | | 126/25 AA |
| 3,033,190 A * | 5/1962 | Atkinson | | 126/25 AA |
| 3,085,497 A * | 4/1963 | Statia, Sr. | | 99/340 |
| 3,106,150 A * | 10/1963 | Gaeke | | 99/340 |
| 3,131,685 A * | 5/1964 | Bergfield | | 126/25 AA |
| 3,217,634 A * | 11/1965 | Fox | | 99/339 |
| 3,258,001 A * | 6/1966 | Virgil | | 126/25 AA |
| 3,298,301 A * | 1/1967 | Lowndes | | 99/340 |
| 3,512,515 A * | 5/1970 | McGee | | 126/25 A |
| 3,657,996 A * | 4/1972 | Thompson | | 99/443 R |
| 3,667,376 A * | 6/1972 | Thompson | | 99/443 R |
| 3,683,791 A * | 8/1972 | Rast, Jr. | | 99/340 |
| 3,688,758 A * | 9/1972 | Stephen, Jr. | | 126/41 R |
| 3,756,140 A * | 9/1973 | Kolivas | | 99/339 |
| 3,785,275 A * | 1/1974 | Keats et al. | | 99/446 |
| 4,129,111 A * | 12/1978 | Lehtovaara | | 126/25 AA |
| 4,469,019 A * | 9/1984 | Baer | | 99/339 |
| 4,541,406 A * | 9/1985 | DaSambiagio | | 126/9 R |
| 4,732,138 A * | 3/1988 | Vos | | 126/25 A |
| 4,882,985 A * | 11/1989 | Beller | | 99/426 |
| 4,932,391 A * | 6/1990 | Bierdeman | | 126/30 |
| 5,025,715 A * | 6/1991 | Sir | | 99/421 HV |
| 5,163,358 A * | 11/1992 | Hanagan et al. | | 99/339 |
| 5,410,950 A * | 5/1995 | Rone | | 99/421 HV |
| 5,477,028 A * | 12/1995 | Chang | | 219/386 |
| 5,787,873 A * | 8/1998 | Whitehouse | | 126/25 R |
| 5,908,026 A * | 6/1999 | Forst | | 126/25 AA |
| 5,964,212 A * | 10/1999 | Thompson | | 126/25 R |
| 6,041,695 A * | 3/2000 | Kuopus | | 99/428 |
| 6,564,793 B2 * | 5/2003 | DeClue | | 126/25 AA |
| 6,929,001 B2 * | 8/2005 | Yoon | | 126/25 AA |
| 7,063,006 B1 * | 6/2006 | Spehle et al. | | 99/340 |
| 7,823,577 B1 * | 11/2010 | Babjak | | 126/25 AA |
| 8,430,088 B1 * | 4/2013 | Gallaher | | 126/25 AA |
| 2008/0217266 A1 * | 9/2008 | Doyal | | 211/1.52 |

OTHER PUBLICATIONS

Written Opinion for PCT/MX2010/000109.

* cited by examiner

ROTATING GRILL FOR GRILLING FOOD

CROSS REFERENCE TO RELATED APPLICATIONS

This application claims benefit of and priority to the following Patent Cooperation Treaty Application PCT/MX2010/000109 filed Oct. 12, 2010; the above cited application is hereby incorporated by reference herein as if fully set forth in its entirety.

TECHNICAL FIELD

This invention has its technical field in mechanics, more precisely in those devices or mechanisms known as grills, which use ignited charcoal to roast food portions, mainly meats and different kinds of animal species.

OBJECT OF THE INVENTION

To provide a grill that allows to move away or distance in a controlled fashion the grill surface with relation to the heat source, a second objective is that such grill counts with different temperature zones for different roasting points. Finally, as a third objective, this grill shall exhibit to the diners the foods as they spin over the grill surface.

BACKGROUND

It is known that people around the world enjoy gathering with friends and family to eat roasted foods, in virtue of the taste these acquire. In the technical state there are diverse spinning food grills, such is the case of the U.S. Pat. No. 6,929,001 which describes a spinning barbecue grill, which includes a disc grill surface, a shaft extending from the disc grill surface, so the shaft becomes perpendicular to the grill surface, a bowl that has a canal where the shaft is dismountable, received through the canal, and an adjunct motor to the bowl to generate the rotation of the shaft. The inconvenient with this grill is that it is too rudimentary.

On the other hand, the patent requests PCT/EP/2007/006544 and US 20070117500 make reference to roasting methods and devices to roast foods such as barbecue, which use motors, shafts and grills that may adopt different configurations. Such grills that are mounted at least on one column or legs to fix them to the floor surface at the same time provide them with sturdiness. The problem is that they cannot regulate the distance between the grill surface and the ignited charcoal, and they do not count with compartments where different roasting temperatures may be kept.

DESCRIPTION OF THE INVENTION

The characteristic details of this innovative spinning food grill are clearly shown in the following description and in the figures herein contained, which are mentioned as an example and should not be considered to be limitative of this invention.

Figure 9:
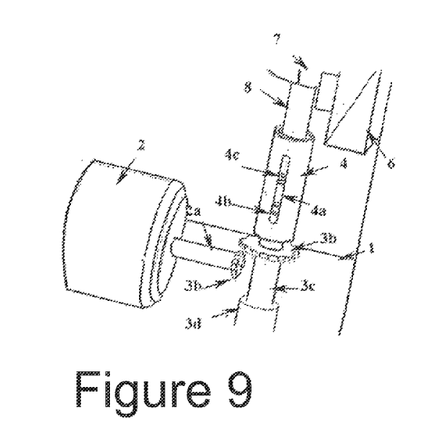
FIG. 9 is a detail of the reducing element of the spinning food grill.
Figure 10:
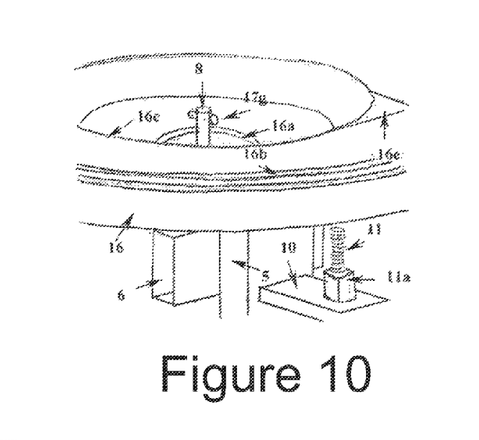
FIG. 10 illustrates a detail of the upper side of the main shaft.
Figure 11:
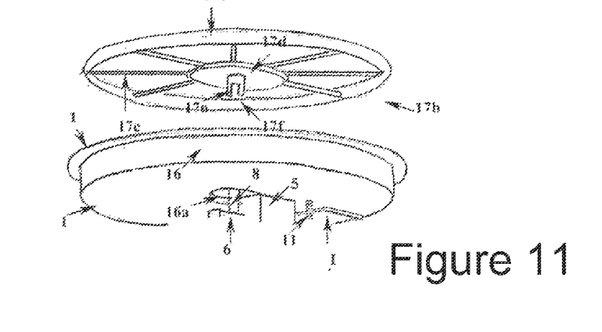
FIG. 11 is a detail in inferior perspective of the wheel of the spinning food grill.

With reference to such figures, the spinning food grill is characterized for being integrated by:

a) a rectangular base (1), made up of a metal plate which counts with a hole near each of its corners used to introduce in them screws (1b) that allow to fix the base against the floor surface; upon such surface the following elements are mounted;

b) an electric motor (2) of 1 HP, of variable speed, which is provided with electric energy through a cable that connects to the municipal network with 110 V AC, its shaft (2a) spins parallel to the rectangular base and is connected to;

c) a reducing device (3), which allows to control the spin speed of the electric motor shaft, in such a way that it optionally spins at low rpm; also the reducing device counts with a protective covering with a hole in one of its sides for the motor shaft to go through and a hole in the center of its superior surface used for an extension of the shaft; in the interior of the reducing device gears act (3b), a section of the perpendicular shaft (3c) and a tread (3d), located on the base of the protective covering, which supports the weight of the circular grill surface described below; it is important to note that together these three parts allow the motor shaft (2a) to transmit its spinning movement perpendicularly to the base (1);

d) the shaft extension (4) that emerges out of the superior surface of the protective covering of the reducing device (3); this shaft extension is basically a metal tube containing the perpendicular section of the shaft (3c), which is located in the lower part since it comes from the reducing device; on the other hand in the interior of the extension, in the upper part, the inferior end of the main shaft described below is introduced. The extension of the shaft has a longitudinal spline (4a) which has two functions: the first is to allow to introduce in it a first screw (4b) that is screwed in the upper part of the perpendicular shaft section (3c) and a second screw (4c) that is screwed in the lower part of the main shaft in such a way that when the perpendicular section of the shaft spins (3c), this drags, through the first screw (4b) the extension of the shaft (4) and this extension spins the main shaft due to the same effect. In its second function, the second screw (4c) may move along the spline (4a), and due to this the lower end of the main shaft can move along the interior of the shaft extension (4), e) a post (5), perpendicular to the rectangular base (1), formed by a rectangular PTR piece, which lower end is welded in the central zone of such base (1). Over the posterior surface of the post there are the following screwed elements:

i) a pair of crossbars (6), also made rectangular pieces and that are distributed along the post, dividing it into three similar sections; each crossbar has screwed over it;
ii) an oarlock (7) that allows the free spin of;
f) the main shaft (8) which spins parallel to the post (5) since it is connected in its lower end to the reducing device of the motor (2). Such main shaft is connected in its central zone to a height regulator for the grill surface described below; the superior end of the main shaft (8) is connected to a circular grill surface. The main shaft may go up by extending itself above the post (5) or simply can go down as it spins thanks to the oarlocks (7); while this operation is done, it moves parallel to the post (5). As previously described, the main shaft (8) is connected to;
g) the height regulator (9), for the circular grill surface, which is located in the front side of the post (5). Such regulator is composed of:
  i) a platform (10), made from a smaller rectangular plate that is welded next to the superior end of the post (5), through one of its smaller sides, so that it is located perpendicular to this post; such platform counts has a hole on its other smaller side in which the following elements are introduced:
  ii) a screw (11), which is kept in position with a first nut (11*a*), which holds it from the lower side and a second nut (11*b*), which holds it from the upper side of the platform (10), that way the screw (11) may move perpendicularly to the platform, moving up or down. Under the first nut (11*a*) there is;
  iii) a wheel (12) made up from a metallic disc that is connected perpendicularly to the screw (11), in such a way that when the wheel spins, in consequence the screw spins (11); please note that such wheel is held through a third nut (11*c*) located in the screw (11) and under the lower surface of the wheel. On the other hand, the lower end of the screw (11), is screwed to a coupler (13) in a "U" shape which receives it in its interior; this coupler is united to;
  iv) a double-arm balance beam (14), similar to a "U", which contains the post (5). Each arm has in its middle-point, a hole used to introduce a screw (14*a*), which is introduced at the same time in each lateral side of the post (5), in such a way that this screw functions as a pivot, since when the end of the balance beam that is held to the coupler (13), of the screw (11), is pushed down and as a consequence the other end moves up and in doing so it moves the main shaft through the middle of;
  v) a pulley (15), which is welded to the main shaft (8) in its central zone. Such pulley is connected through a guide to the end of each double-arm of the balance beam (14). Each guide has a tread which makes contact in the groove of the pulley (15), in such a way that when the shaft spins, also the tread spins inside the pulley, which pushes the pulley without stopping it, in a way in which the main shaft moves optionally up or down and in consequence moves the circular grill surface;
h) a container (16), used for the ignited charcoal, which is similar to a pot with low walls, without a lid; such container counts with a hole (16*a*), in the center so that the upper end of the main shaft moves through it (8), this container additionally has a raised edge (16*b*), perpendicular to the walls, which allows the container to couple and sustain inside the circular cavity formed in a cover, in case that the grill is in its display modality, since it covers all mechanisms and the only thing that is visible is the circular grill surface with the foods roasting. On the other hand this charcoal container counts in its interior with a circular wall (16*a*), that allows to separate the ignited charcoal, in such way two compartments are formed, which are used to maintain the ignited charcoal within, at different temperatures. The container ahs a cavity, at the bottom, to remove the charcoal remains, as well as food remains that could fall in the interior of the container; the cavity is covered with a tray (16*e*) with a handle (16*f*), which, when pulled outwards, opens the bottom of the container cavity, allowing the removal of wastes:
i) the circular grill surface (17), conformed by:
  i) a wheel, similar in design to an old wagon wheel; spins in the upper end of the main shaft, this wheel is made of a ring (17*b*) and eight rods (17*c*), which converge at the center of the ring, dividing it in eight equal triangles with a curved base; the wheel also counts in its lower surface with a central disc (17*d*), that has a couple in the lower surface, at the center (17*e*) used to couple inside of it, the upper end of the main shaft (8). The couple (17*e*) has a niche (170, in which the safety screw (17*g*) located perpendicular to the upper end of the post (5), in such a way that when upper end of the post (5) is introduced within the couple, the safety screw also does it in the niche, so when the main shaft spins, it makes the circular grill (17) spin, and the following elements are mounted on top of it:
  ii) triangular grill surfaces (18) and triangular pans (19), used to roast the foods over their surface; such grills are mounted over rods (17*c*);
j) a control panel (20) where the buttons described as follows are located: an on button (20*a*), an off button (20*b*) and the electric motor as well as a knob (20*c*), to regulate the rpm of the circular grill.

This invention provides three modalities of covers pursuant to the protection of the previously described mechanisms, optionally it adopts these accessories in case it is intended to be used outdoors in gardens or beaches.

Figure 1:
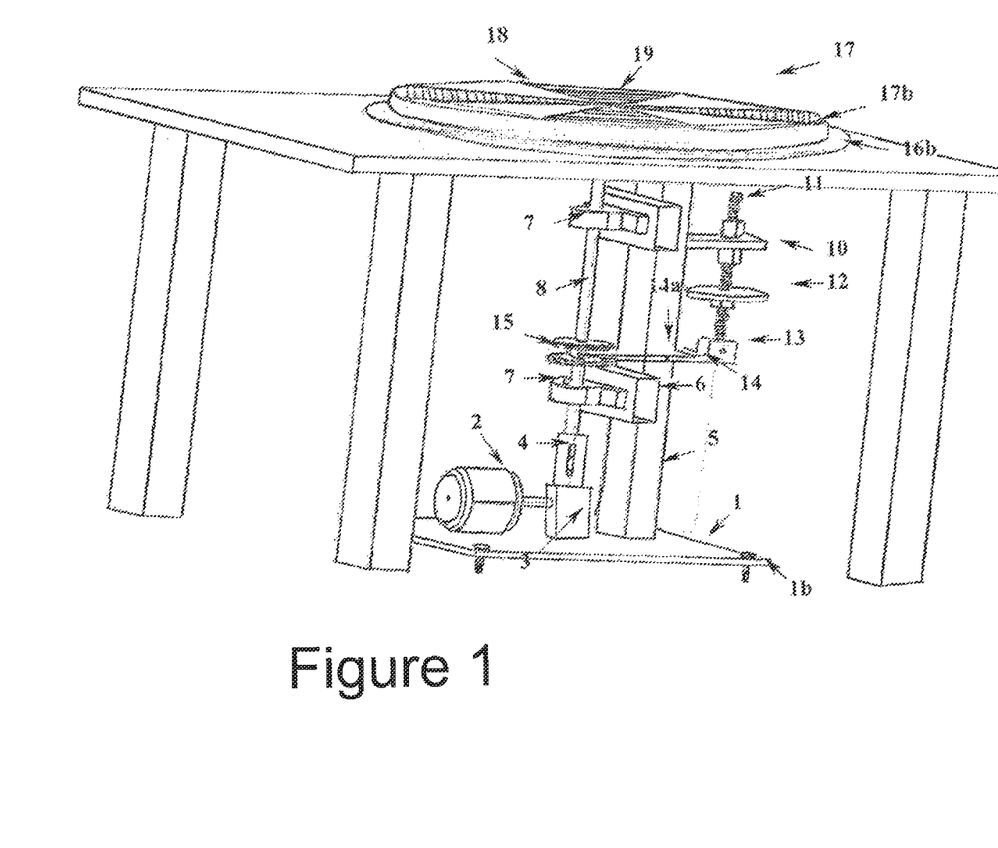
FIG. 1 is a perspective view in frontal elevation of the spinning food grill applied to the surface of a table.
Figure 2:
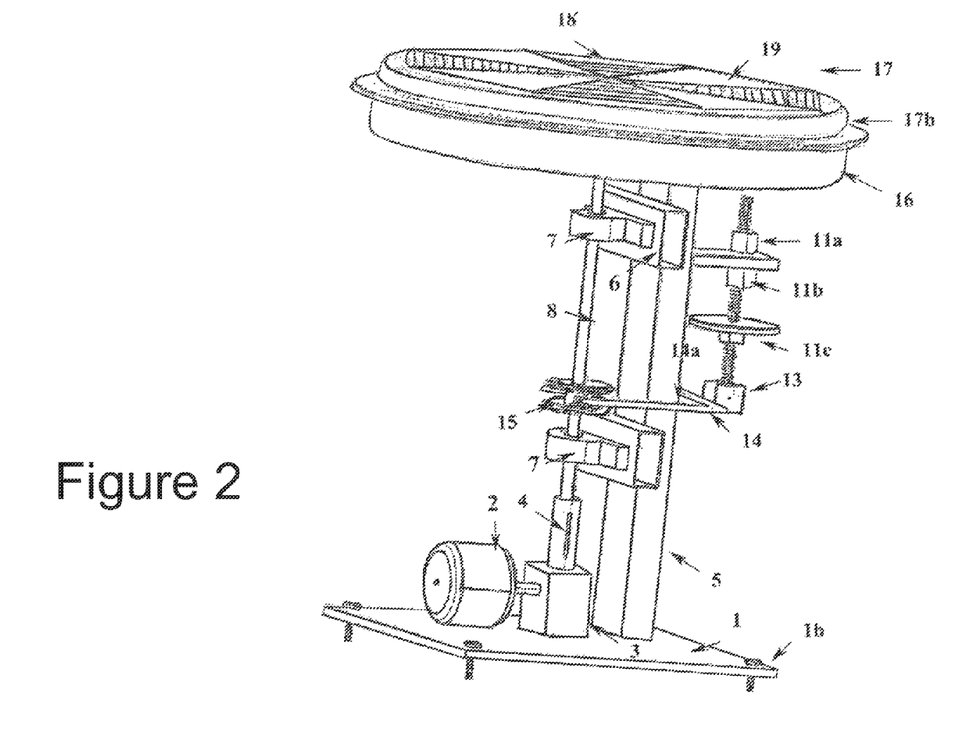
FIG. 2 illustrates a perspective view in posterior elevation of the spinning food grill outside the surface.
Figure 3:
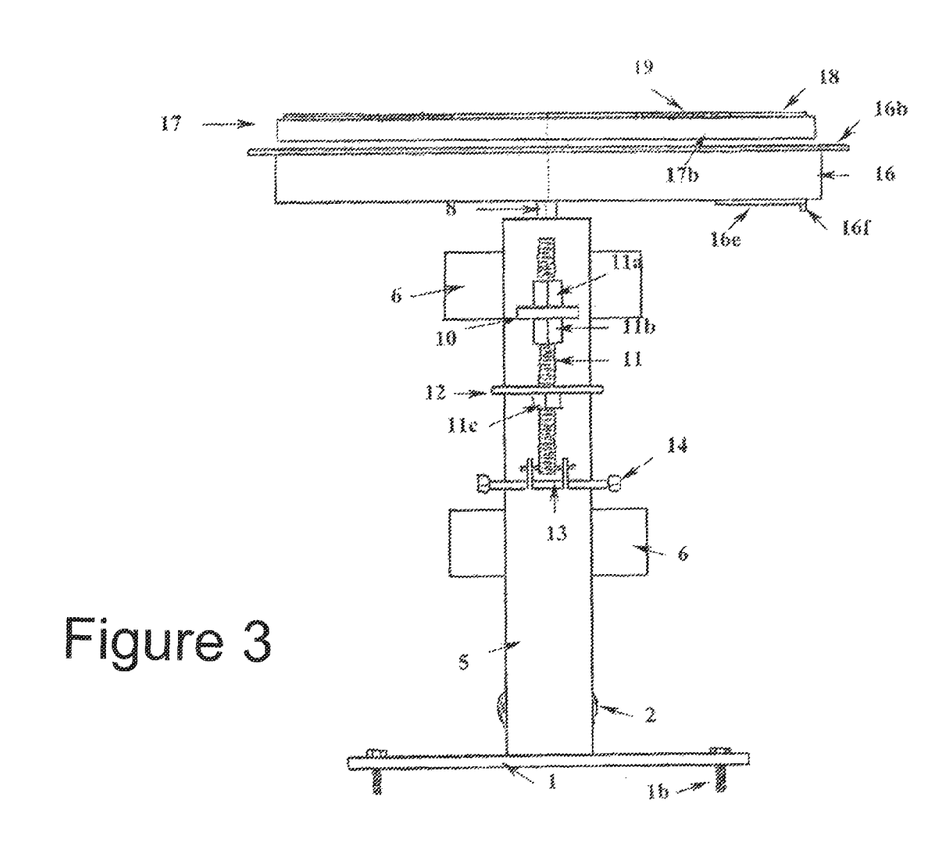
FIG. 3 is a frontal view of the integrated spinning food grill.
Figure 4:
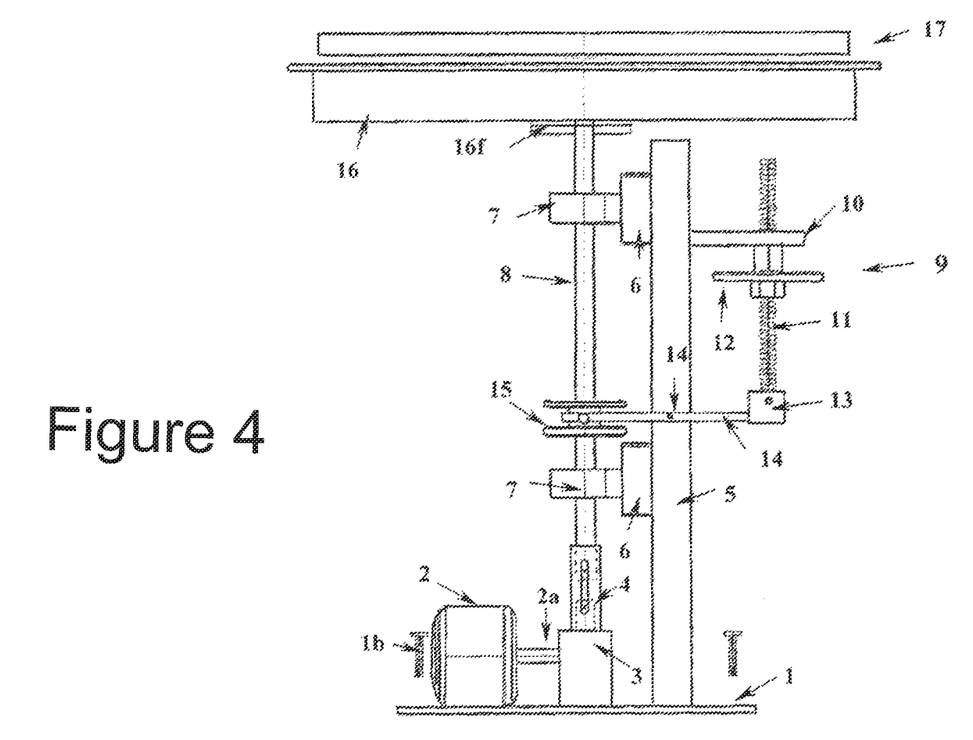
FIG. 4 illustrates a lateral view of the integrated spinning food grill.
Figure 5:
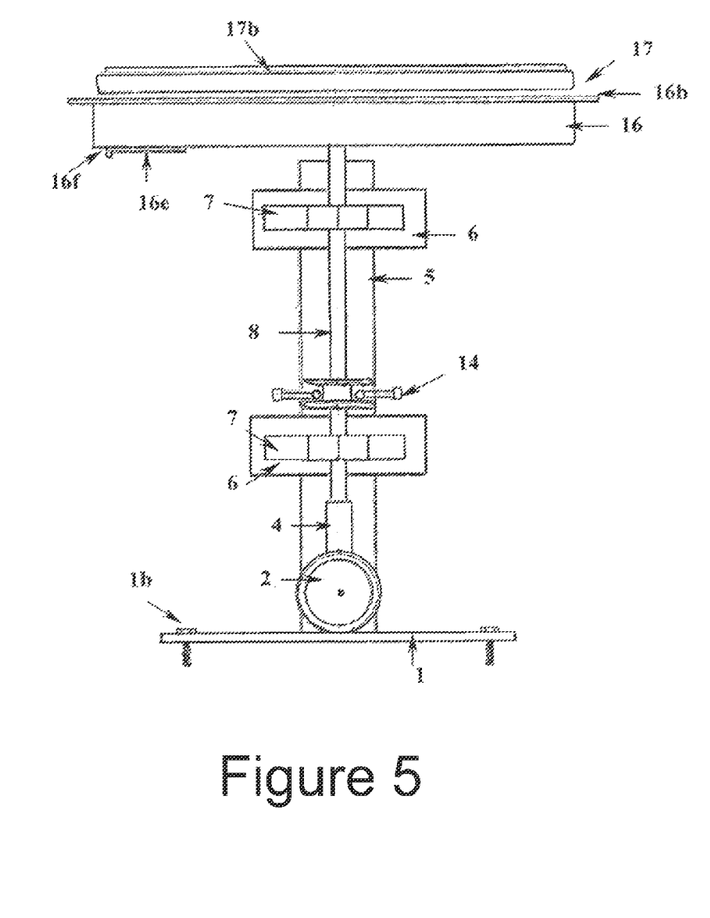
FIG. 5 is a posterior view of the integrated spinning food grill.
Figure 6:
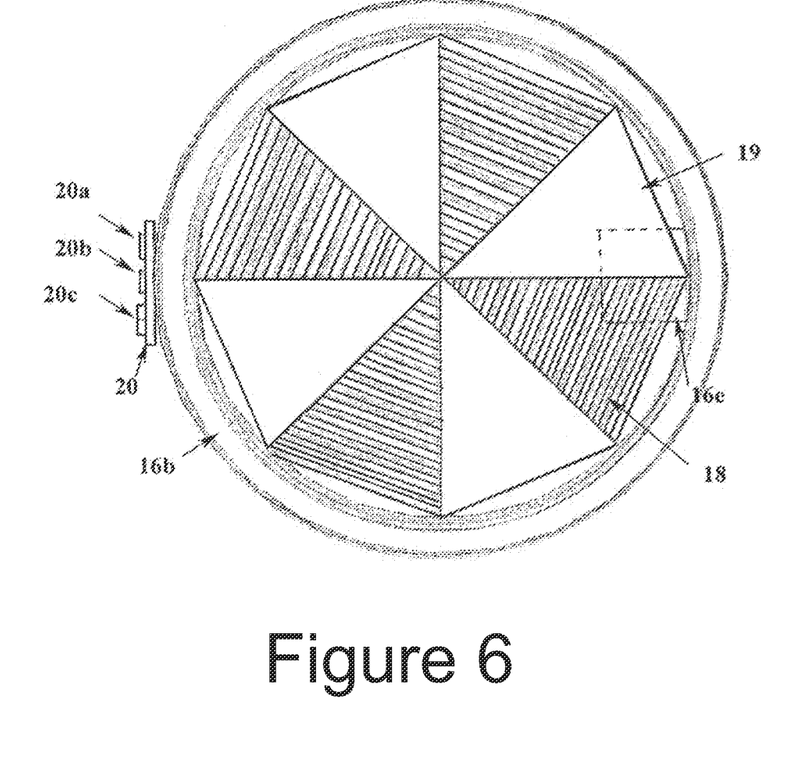
FIG. 6 is a superior view of the integrated spinning food grill.
Figure 7:
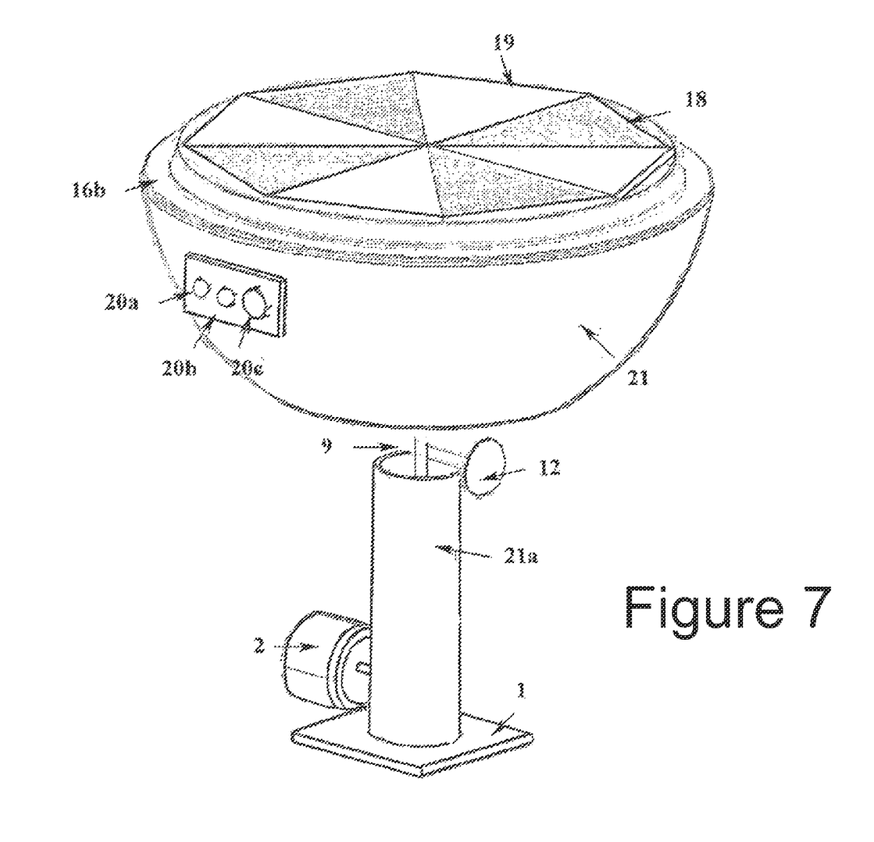
FIG. 7 illustrates a perspective view of the first modality of the cover of the spinning food grill.

In the first modality the grill has:

1.—a cover similar to a glass, with half hollow sphere (21); in the opening lies the charcoal container of the circular grill (17);

2.—a tube (21*a*) which is connected by its upper end to the center of the concave part of the half sphere to support it, its lower end is welded to;

3.—a base, in this modality the wheel that regulates the height is located between the half hollow sphere (21) and the tube (21*a*).

Figure 8:
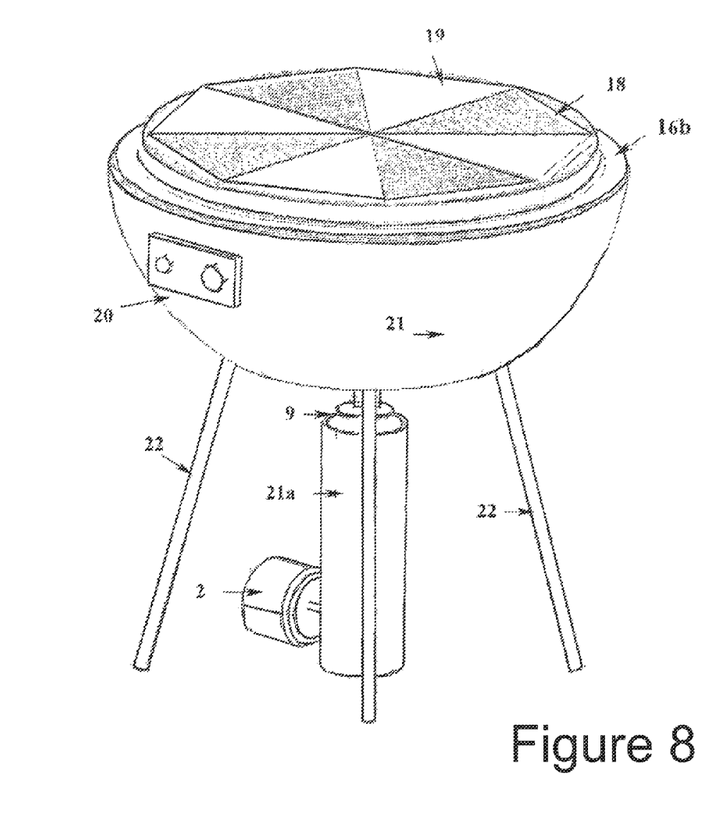
FIG. 8 illustrates a perspective view of the second modality of the cover of the spinning food grill.

In the second modality the grill consists of:

It can be considered that this is a sub-modality of the first modality, since it uses the same half hollow sphere (22), and the same tube (22*a*), with the difference that the base is substituted by four legs (22*b*), which are distributed around the concave part of the half sphere, the upper ends are united to the concave part of the half sphere (22), supporting its weight.

It is important to point out that under the second modality both the electric motor (2) and the wheel that regulates the height (12) are left outside the protective cover.

Based on the previous descriptions, we may affirm that this spinning food grill provides the following benefits:

Easy maintenance.
Controllable speed.
Controllable roasting temperatures.
For indoor or outdoor use.

One embodiment of the present invention is directed to a spinning food grill, which uses at least one electric motor that spins a shaft perpendicularly to the ground, which spins circular grill surfaces upon which foods are roasted, under such grill surfaces at least one container for ignited charcoal is placed, characterized because it consists of:

a rectangular base, made up of a metal plate which counts with a hole near each of its corners used to introduce in them screws that allow to fix the base against the floor surface; upon such surface the following elements are mounted;

an electric motor of variable speed, which is provided with electric energy through a cable that connects to the municipal network with 110 V AC, its shaft spins parallel to the rectangular base and is connected to;

a reducing device, which allows to control the spin speed of the electric motor shaft, in such a way that it optionally spins at low rpm; also the reducing device counts with a protective covering with a hole in one of its sides for the motor shaft to go through and a hole in the center of its superior surface used for an extension of the shaft; in the interior of the reducing device gears act, a section of the perpendicular shaft and a tread, located on the base of the protective covering, which supports the weight of the circular grill surface described below; it is important to note that together these three parts allow the motor shaft to transmit its spinning movement perpendicularly to the base;

the shaft extension that emerges out of the superior surface of the protective covering of the reducing device; this shaft extension is basically a metal tube containing the perpendicular section of the shaft, which is located in the lower part since it comes from the reducing device; on the other hand in the interior of the extension, in the upper part, the inferior end of the main shaft described below is introduced. The extension of the shaft has a longitudinal spline which has two functions: the first is to allow to introduce in it a first screw that is screwed in the upper part of the perpendicular shaft section and a second screw that is screwed in the lower part of the main shaft in such a way that when the perpendicular section of the shaft spins, this drags, through the first screw the extension of the shaft and this extension spins the main shaft due to the same effect. In its second function, the second screw may move along the spline, and due to this the lower end of the main shaft can move along the interior of the shaft extension, a post, perpendicular to the rectangular base, formed by a rectangular piece, which lower end is welded in the central zone of such base. Over the posterior surface of the post there are the following screwed elements:

a pair of crossbars, also made rectangular pieces and that are distributed along the post, dividing it into three similar sections; each crossbar has screwed over it;

an oarlock that allows the free spin of;

the main shaft which spins parallel to the post since it is connected in its lower end to the reducing device of the motor. Such main shaft is connected in its central zone to a height regulator for the grill surface described below; the superior end of the main shaft is connected to a circular grill surface. The main shaft may go up by extending itself above the post or simply can go down as it spins thanks to the oarlocks; while this operation is done, it moves parallel to the post. The main shaft is connected to;

the height regulator, for the circular grill surface, which is located in the front side of the post. Such regulator is composed of:

a platform, made from a smaller rectangular plate that is welded next to the superior end of the post, through one of its smaller sides, so that it is located perpendicular to this post; such platform counts has a hole on its other smaller side in which the following elements are introduced:

a screw, which is kept in position with a first nut, which holds it from the lower side and a second nut, which holds it from the upper side of the platform, that way the screw may move perpendicularly to the platform, moving up or down. Under the first nut there is;

a wheel made up of a disc that is connected perpendicularly to the screw, in such a way that when the wheel spins, in consequence the screw spins; please note that such wheel is held through a third nut located in the screw and under the lower surface of the wheel. On the other hand, the lower end of the screw, is screwed to a coupler which receives it in its interior; this coupler is united to;

a double-arm balance beam, which contains the post. Each arm has in its middle-point, a hole used to introduce a screw, which is introduced at the same time in each lateral side of the post, in such a way that this screw functions as a pivot, since when the end of the balance beam that is held to the coupler, of the screw, is pushed down and as a consequence the other end moves up and in doing so it moves the main shaft through the middle of;

a pulley, which is welded to the main shaft in its central zone. Such pulley is connected through a guide to the end of each double-arm of the balance beam. Each guide has a tread which makes contact in the groove of the pulley, in such a way that when the shaft spins, also the tread spins inside the pulley, which pushes the pulley without stopping it, in a way in which the main shaft moves optionally up or down and in consequence moves the circular grill surface;

a container, used for the ignited charcoal, which is similar to a pot with low walls, without a lid; such container counts with a hole, in the center so that the upper end of the main shaft moves through it, this container additionally has a raised edge, perpendicular to the walls, which allows the container to couple and sustain inside the circular cavity formed in a cover, in case that the grill is in its display modality, since it covers all mechanisms and the only thing that is visible is the circular grill surface with the foods roasting. On the other hand this charcoal container counts in its interior with a circular wall, that allows to separate the ignited charcoal, in such way two compartments are formed, which are used to maintain the ignited charcoal within, at different temperatures. The container ahs a cavity, at the bottom, to remove the charcoal remains, as well as food remains that could fall in the interior of the container; the cavity is covered with a tray with a handle, which, when pulled outwards, opens the bottom of the container cavity, allowing the removal of wastes:

the circular grill surface, conformed by:

a wheel, similar in design to an old wagon wheel; spins in the upper end of the main shaft, this wheel is made of a ring and eight rods, which converge at the center of the ring, dividing it in eight equal triangles with a curved base; the wheel also counts in its lower surface with a central disc, that has a couple in the lower surface, at the center used to couple inside of it, the upper end of the main shaft. The couple has a niche, in which the safety screw located perpendicular to the upper end of the post, in such a way that when upper end of the post is introduced within the couple, the safety screw also does it in the niche, so when the main shaft spins, it makes the circular grill spin, and the following elements are mounted on top of it:

triangular grill surfaces and triangular pans, used to roast the foods over their surface; such grills are mounted over rods;

a control panel where the buttons described as follows are located: an on button, an off button and the electric motor as well as a knob, to regulate the rpm of the circular grill.

In one embodiment the spinning food grill uses at least one electric motor that spins a shaft perpendicularly to the ground, which spins circular grill surfaces upon which foods are roasted, under such grill surfaces at least one container for ignited charcoal is placed, optionally has a cover with half hollow sphere; in the opening lies the charcoal container of the circular grill; a tube which is connected by its upper end to the center of the concave part of the half sphere to support it, its lower end is welded to a base, in this modality the wheel that regulates the height is located between the half hollow sphere and the tube.

In another embodiment of the spinning food grill, which uses at least one electric motor that spins a shaft perpendicularly to the ground, which spins circular grill surfaces upon which foods are roasted, under such grill surfaces at least one container for ignited charcoal is placed, the base is substituted by four legs, which are distributed around the concave part of the half sphere, the upper ends are united to the concave part of the half sphere, supporting its weight. It is important to point out that under the second modality both the electric motor and the wheel that regulates the height are left outside the protective cover.

Having sufficiently described my invention, I consider it to be innovative and therefore I claim as my exclusive property the content of the following assertions:

1. A spinning food grill, comprising:
   at least one electric motor that spins a motor shaft parallel to the ground, the motor shaft connected to a shaft that is perpendicular to the ground and fixed to a plurality of circular grill surfaces upon which food can be roasted such that rotation of the shaft rotates the plurality of circular grill surfaces, the shaft comprising a perpendicular shaft, a shaft extension, and a main shaft,
   a reducing device connected to the motor shaft, the reducing device comprising a plurality of gears, a first lower section of the perpendicular shaft, and a tread which supports the weight of the circular grill surfaces, the plurality of gears, the first lower section of the perpendicular shaft and the tread combining to allow the motor shaft to transmit its spinning movement perpendicularly to the ground;
   the shaft extension emerges out of a major surface of the reducing device; the shaft extension comprising a tube containing an upper section of the perpendicular shaft, which is located in a lower part the shaft extension, and a second lower section of the main shaft being located in an upper part of the shaft extension, the shaft extension further comprises a longitudinal spline which is configured to receive a first protuberance that is disposed on the upper section of the perpendicular shaft and is configured to receive a second protuberance that is disposed on the second lower section of the main shaft in such a way that when the perpendicular shaft rotates, the shaft extension rotates thereby rotating the main shaft, the second protuberance being adapted to move along the longitudinal spline,
   a height regulator for the circular grill surface, the height regulator spaced from the main shaft, the height regulator comprising: a platform, a wheel, a screw, and a double-arm balance beam,
   the platform being fixed on the spinning food grill and defining a hole therein adapted for the screw to extend therethrough,
   the wheel being positioned on the screw such that when the wheel spins the screw spins thereby moving the screw vertically with respect to the platform, a coupler being connected to the screw and a first end of the double-arm balance beam, a middle portion of the double-arm balance beam being pivotally connected to the spinning food grill at a location between the main shaft and the height regulator, the second end of the double-arm balance beam is connected to a pulley that is located on the main shaft such that vertical movement of the screw raises or lowers the main shaft, raising or lowering of the main shaft in turn extends or reduces the total length of the shaft, respectively.

2. The spinning food grill according to claim 1, wherein the spinning food grill has a cover with half hollow sphere; in an opening lies a charcoal container of the spinning food grill.

3. The spinning food grill according to claim 1, further comprising at least three legs supporting its weight.

4. The spinning food grill according to claim 1, further comprising a control panel comprising: an on button, an off button, and a knob that regulates the rpm of the spinning food grill.

5. The spinning food grill according to claim 1, wherein the screw is connected the platform by a first nut, which holds it from the lower side of the platform, and a second nut, which holds it from the upper side of the platform.

6. The spinning food grill according to claim 1, further comprising a post extending vertically between the main shaft and the height regulator.

7. The spinning food grill according to claim 6, wherein the platform is fixed to the post.

8. The spinning food grill according to claim 7, wherein the post includes a pair of crossbars attached thereto, each of the pair of crossbars has an oarlock that allows free spin of the main shaft.

9. The spinning food grill according to claim 6, wherein the middle portion of the double-arm balance beam is pivotally connected to the post.

* * * * *